United States Patent [19]

Shimbara

[11] Patent Number: 4,586,761
[45] Date of Patent: May 6, 1986

[54] UNIT CASE HOUSING APPARATUS
[75] Inventor: Sakuzo Shimbara, Hiroshima, Japan
[73] Assignee: Nifco Inc., Yokohama, Japan
[21] Appl. No.: 543,553
[22] Filed: Oct. 19, 1983
[30] Foreign Application Priority Data
  Oct. 19, 1982 [JP] Japan .................. 57-182054
[51] Int. Cl.[4] .................................... A47B 88/04
[52] U.S. Cl. .................. 312/319; 312/311; 312/323; 312/330 R
[58] Field of Search ........... 312/12, 15, 18, 19, 312/311, 319, 331, 330 R, 322, 323; 16/84; 235/100

[56] References Cited

U.S. PATENT DOCUMENTS

| | | | |
|---|---|---|---|
| 473,555 | 4/1892 | Johns | 312/331 |
| 588,565 | 8/1897 | Friesen | 312/319 |
| 591,134 | 10/1897 | Howard | 312/331 |
| 666,359 | 1/1901 | Schroeder | 312/319 X |
| 790,916 | 5/1905 | Pederson | 312/322 X |
| 1,066,518 | 7/1913 | Nickol et al. | 312/319 |
| 1,546,387 | 7/1925 | Kerr | 312/311 |
| 2,209,733 | 7/1940 | Jones | 16/84 |
| 2,364,604 | 12/1944 | Creager | 312/319 X |
| 2,492,871 | 12/1949 | King | 312/323 X |
| 2,681,263 | 6/1954 | Angelillo | 312/319 X |
| 3,148,007 | 9/1964 | Bertrand | 312/323 |
| 3,250,234 | 5/1966 | Holt | 312/323 X |
| 3,836,222 | 9/1974 | Kuntze | 312/319 |
| 4,061,378 | 12/1977 | Matsumoto | 312/319 X |
| 4,343,244 | 8/1982 | Moriarty et al. | 312/323 X |

FOREIGN PATENT DOCUMENTS

| | | | |
|---|---|---|---|
| 232862 | 9/1944 | Switzerland | 312/319 |
| 320674 | 10/1929 | United Kingdom | 312/15 |

Primary Examiner—Francis K. Zugel
Assistant Examiner—Thomas A. Rendos
Attorney, Agent, or Firm—Trexler, Bushnell & Wolters Ltd.

[57] ABSTRACT

A unit case housing apparatus for storing a unit case in a housing in the fashion of a drawer has an operating member provided on the face of the housing, which when operated causes the unit case to be pushed out from the front of the housing so that it can be removed therefrom.

3 Claims, 4 Drawing Figures

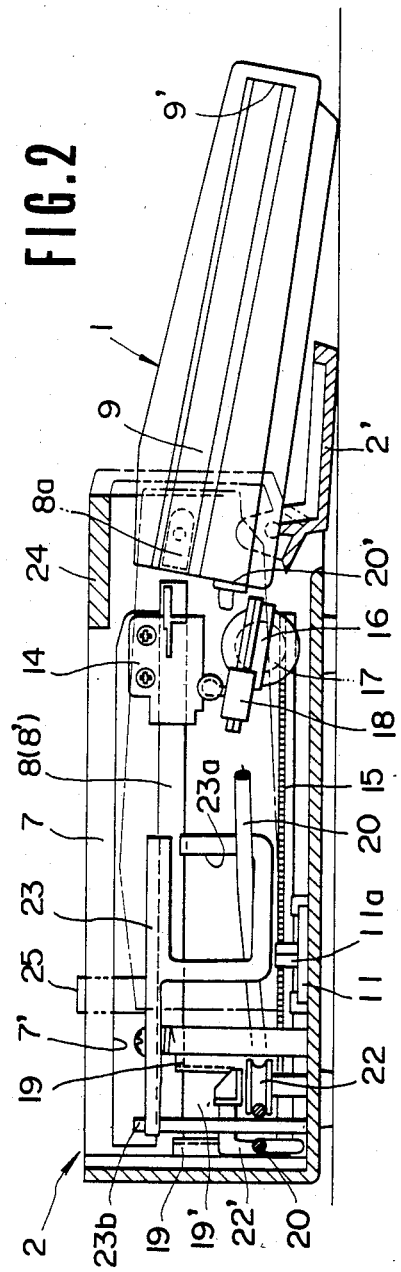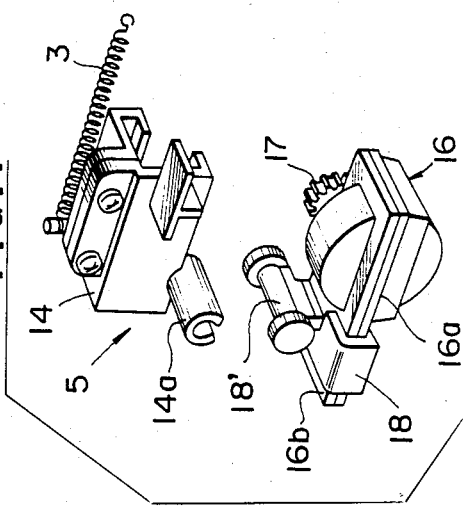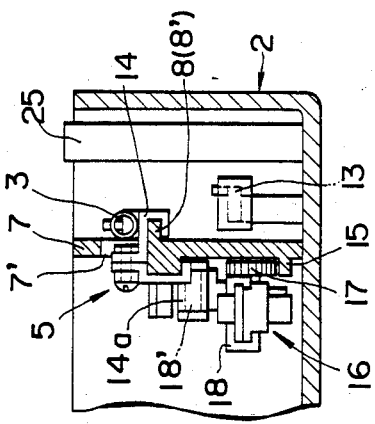

UNIT CASE HOUSING APPARATUS

BACKGROUND OF THE INVENTION

This invention relates to a unit case housing apparatus for storing a unit case within a housing in the fashion of a drawer wherein the unit case is urged out from the front face of the housing upon operation of an operating member exposed on the front surface of the housing.

There has been marketed a radio cassette (a radio and tape recorder combined in a single unit) which has an electronic keyboard-type musical instrument housed within the radio cassette unit in the fashion of a drawer. With this arrangement, when the user wishes to play the housed musical instrument, it is necessary for him to first pull the instrument out of the housing or to cause it to be ejected therefrom by some kind of mechanism.

SUMMARY OF THE INVENTION

The object of this invention is to provide a unit case housing apparatus for storing a unit case which permits the unit case to be pushed out of a housing upon the operation of an operating device.

This object of the present invention is attained by providing a unit case housing apparatus which comprises a unit case, a housing for storing the unit case in the fashion of a drawer, at least one energizing means for drawing the unit case in the direction of the front face of the housing, an engaging means for retaining the unit case in stored condition in the housing against the force of the energizing means, at least one pusher linked with the energizing means for urging the unit case from behind and pushing it out from the front face of the housing, and a release means for releasing the engaging means.

The above and other objects of this invention, as well as its special features, will be clear from the following detailed description made with reference to the attached drawings.

BRIEF EXPLANATION OF THE DRAWINGS

FIG. 2 is a side cross-sectional view of the housing apparatus shown in FIG. 1.

FIG. 3 is a front cross-sectional view of an essential part of the housing apparatus shown in FIG. 1.

FIG. 4 is an exploded perspective view of the pusher employed in the housing device shown in FIG. 1.

DESCRIPTION OF PREFERRED EMBODIMENT

Figure 1:
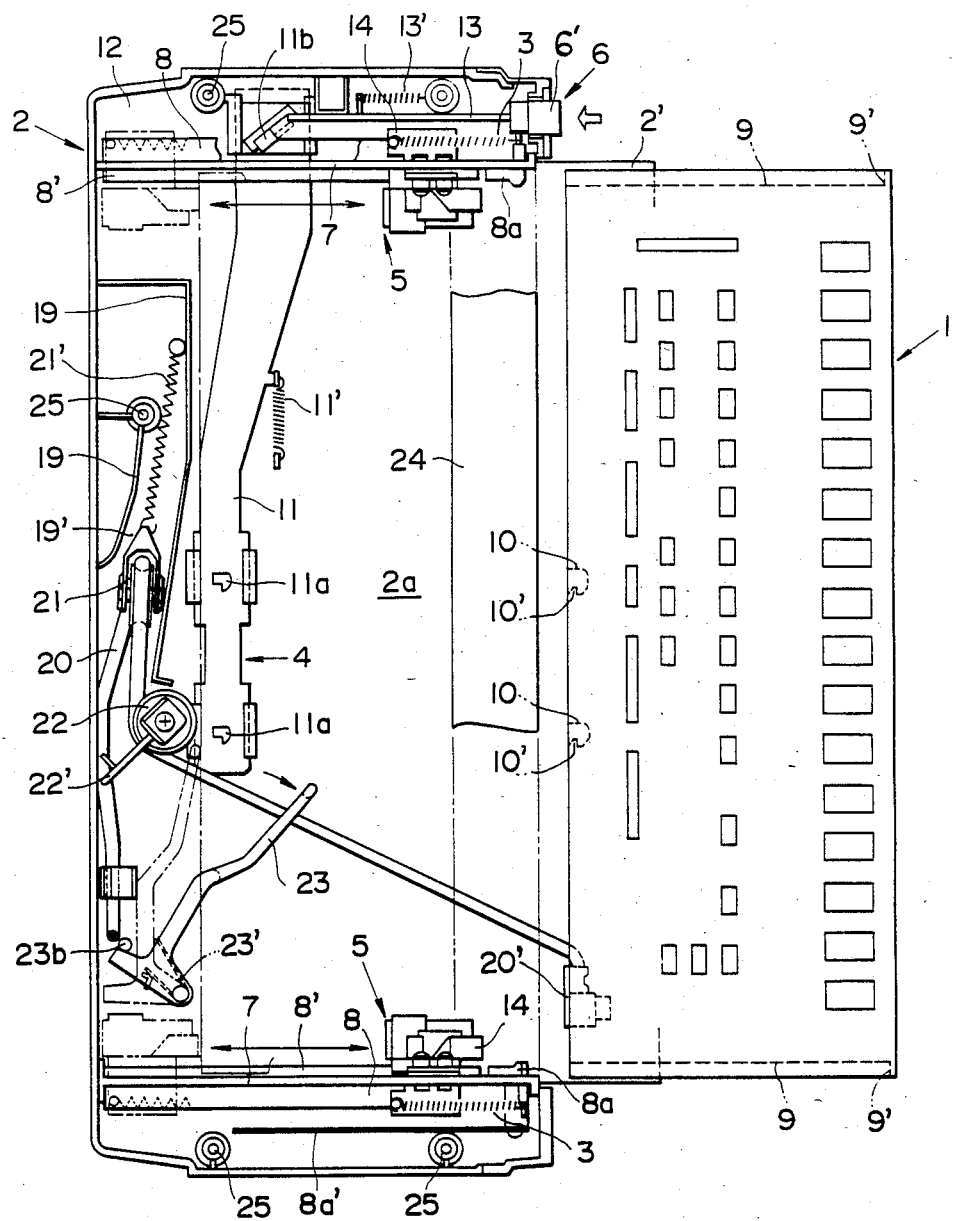
FIG. 1 is a plan view showing one embodiment of the unit case housing apparatus according to this invention.

The invention will now be explained in respect of an embodiment wherein the unit case is an electronic keyboard-type musical instrument which is stored in drawer-like fashion within a housing in a radio cassette.

As shown in the figures, the radio cassette has a housing 2 wherein there are provided a pair of drawing springs 3 for drawing a unit case 1 toward the front face of the housing 2, an engaging means 4 for retaining the unit case 1 in the stored condition in the housing 2 against the force of the drawing springs 3, a pair of pushers 5 linked with the drawing springs 3 for urging the unit case 1 from behind and pushing it out from the front face of the housing 2, and a release means 6 which releases the unit case 1 from its retention by the engaging means 4 upon operation of an operation member 6' thereof. Although in the embodiment shown in the drawings, the operating member 6' of the release means 6 is located apart from the housing 2, the invention is of course not limited to this arrangement and the operating member may instead be located on the unit case 1. In other words, it is only required that a mechanism be provided for releasing the unit case 1 from its state of retention within the housing 2 and there is no limitation on where the release means 6 or its operating member is located.

The housing 2 has a pair of lateral partition walls 7 provided parallel to one another one on the right and one on the left so as to define a storage part 2a therebetween. The open front face of the storage part 2a is provided with a hinged cover 2' which swings vertically and closes the open front face when in upward position.

Each of the lateral partition walls 7 has a window-like opening 7' extending over nearly the full length of the upper part thereof. The bottom edge of this window is formed into a rail or guide 8 of T-shaped cross section and the inwardly projecting flange 8' (corresponding to one side of the crossbar of the T) of this rail 8 fits slidably into a complementary lateral groove or guide 9 on the associated side of the unit case 1 so that the unit case 1 is supported with its bottom slightly above the bottom of the housing 2 and is free to slide to and fro in the inward/outward direction of the housing 2. The front ends 9' of the grooves 9 are closed so that the unit case 1 can be pushed into the storage part 2a only until the front ends 9' strike against the front ends of the rails 8. This is the state in which the unit case is stored. (As indicated by the chain lines in FIGS. 1 and 2.) The rear part of the bottom of the unit case 1 is provided with engaging recesses 10 provided with a cam 10' and opening to the rear of the unit case. On the rear part of the floor of the housing 2 is provided an engaging plate 11 which in this embodiment constitutes the aforesaid engaging means 4. The engaging plate 11 is mounted to be laterally slidable and is drawn in one direction by a spring 11'. On the top surface of engaging plate 11 are provided protuberances 11a adapted to fit into and engage with the engaging recesses 10. When the unit case 1 is pushed inward in the manner described above, the cams 10' of the engaging recesses 10 strike against the protuberances 11a just before the unit case 1 reaches its stored condition thus causing the engaging plate 11 to slide laterally (to the right in this embodiment) overcoming the force of the spring 11'. By this lateral shift the protuberances 11a are put in position to enter engaging recesses 10. Therefore, when the unit case is pushed further inward, the protuberances 11a enter the engaging recesses 10 to the point where the spring 11' can draw the engaging plate 11 back to its original position, causing the protuberances 11a to catch in the lateral notches behind the cams 10'. Thus the unit case 1 is prevented from moving to the front and is retained in its stored state.

The end of the engaging plate 11 toward which it is urged by the spring 11' (the right end in this embodiment) passes under the corresponding partition wall 7 through a notch provided therein and projects into a space 12 defined between the partition wall 7 and the side wall of the housing. The release means 6, the operating member 6' of which protrudes from the front face of the housing 2, has a release lever 13 that is supported along the lower edge of the partition wall 7 so as to be slidable in its axial direction. The release lever 13 is urged toward the front by a spring 13' and has its rear end engaged with an oblique cam hole 11b provided in the right end of the engaging plate 11. By this arrangement, when the operating member 6' is pushed in against the force of the spring 13' (in the direction of the arrow in FIG. 1), the rear end of the release lever 13 slides along the cam hole 11b pushing the engaging plate 11 to the right as viewed from the front against the force of the spring 11'. This shift of the engaging plate 11 causes the protuberances 11a to come free of the laterally notched portions of the engaging recesses 10, whereby the engaging means 4 releases the unit case 1 from its retained state.

At a position rearward of the rearmost position to which the unit case 1 is pushed, frames 14 of the pushers 5 are mounted to straddle and be slidable along the rails 8 of the partition walls 7. The frames 14 are adapted to make contact with the upper part of the rear face of the unit case 1. One end of each drawing spring 3 is connected to one of the frames 14 and the other end is connected to the partition wall 7 on the same side so as to draw the frame 14 toward the front. Thus, when the unit case 1 is pushed into the stored condition, the drawing springs 3 are stretched so that when the operation member 6' is pushed inward to release the unit case 1 from retention by the engaging means 4 in the manner described above, the force of restoration of the drawing springs 3 will cause the frames 14 to push the unit case 1 from behind, causing it to travel toward the front along the rails 8 until a part or all of the unit case 1 is ejected from the front face of the housing 2. When the front face of the storage part 2a is closed by the cover 2', the user will of course be required to open the cover 2' before pushing in the operation member 6'.

In this embodiment, a rack gear 15 is provided to extend along the lower portion of the inside surface of each partition wall 7. Moreover, a damper 16 is swingly suspended by its rear portion from each of the frames 14 so as to hang down along the inside surface of the associated partition wall 7. The damper 16 is adapted to damp the rotation of a toothed wheel or drive element 17 at the forward end thereof and this toothed wheel 17 is held obliquely to engage with the complementary rack gear 15. As the damper 16 there can, for example, be used one such as that disclosed in Japanese Utility Model Application Public Disclosure No. Sho 57(1982)-8604. More specifically, the damper 16 comprises a case 16a filled with oil (grease) and an arm 16b projecting to the rear from the case 16a. The arm 16b is supported on a holder 18 having on its top side a shaft 18' which snap-engages with a clamp 14a in the shape of partially longitudinally cut-away cylinder, in this way to swingly suspend the damper 16 from the frame 14. The shaft of an oil-damped rotator (not shown) housed inside the case 16a extends through the side wall of this case and the toothed wheel 17 is fixed on this shaft. Therefore, when the unit case 1 is pushed into the housing so as to push the frames 14 back along the rails 8, the toothed wheels 17 will not be rotated because the forward ends of the dampers 16 at which the toothed wheels 17 are attached are free to swing vertically and further because the rotation of the toothed wheels is damped by the dampers 16. As a result, the toothed wheel 17 is dragged along the rack gear 15 without rotating. Because of this, in pushing the unit case 1 into the stored condition it is only necessary to exert enough force to overcome the force of the drawing springs 3 as no force is required to overcome the force that would arise should the toothed wheel 17 damped by the damper 16 be rotated through engagement with the rack gear 15. The action of pushing in the unit case 1 is thus very light.

On the other hand, when retention of the unit case 1 is released by pushing in the operation member 6' so that the force of the drawing springs 3 acts via the frames 14 of the pushers 5 to push the unit case 1 forward, the toothed wheels 17 are pushed onto the rack gear 15 and are thus forced to rotate while subject to the braking force of the dampers 16. As a result, the drawing force of the springs 3 is mitigated and the unit case 1 is pushed out quietly and slowly.

A short pivotable auxiliary rail 8a is provided on the inside of each of the partition walls 7 at a position so that when the auxiliary rail or guide 8a is horizontal it constitutes an extension of the inwardly projecting part 8' of the rail or guide 8 which slidably engages with the groove or guide 9 of the unit case 1. The shaft on which the auxiliary rail 8a is pivoted is biased either directly by a spring wound thereon or by a spring acting via a lever 8a' attached thereto so as to hold the rear end of the auxiliary rail 8a in straight-line contact with the front end of the adjacent rail or guide 8. With this arrangement, when the unit case 1 is pushed out and the rear end of the grooves 9 ride onto the auxiliary rails 8a, the auxiliary rails 8a will be pivoted against the force of the springs by the weight of the unit case 1, whereafter the unit case 1 will come out of the storage part 2a in a downwardly inclined fashion (FIG. 2), making it easy to take out.

When the unit case 1 is an electrical device such as an electronic keyboard-type musical instrument and it is necessary for the housing 2 to provide electrical connection between the unit case 1 and a radio cassette or the like, the housing and the unit case are connected by means of a cord. In this case, since the unit case is designed to be moved back and forth between its stored condition within the housing and its operative condition outside the housing, it is best to provide an arrangement which prevents the tangling of the cord.

In the present embodiment, the positioning of the pushers 5 behind the unit case 1 creates a space at the rear of the housing 2 even when the unit case 1 is in the stored condition and this space is used for the storage of such a cord. More specifically, two walls 19 are formed to stand upright from the floor of the housing 2 in this region so as to define a storage part 19'. Within the storage part 19' is provided a pulley 21 over which a cord 20 is passed so as to double back on itself and the pulley 21 is drawn toward the interior of the storage part 19' by a spring 21'. A guide pulley 22 is provided at the entrance of the storage part 19' for changing the direction of the cord 20 as it enters the storage space 19'. The cord 20, which comes from the main unit of the radio cassette located above the housing 2, passes under and is guided by a bracket 22' which also serves to support the guide pulley 22, enters the storage part 19', passes over the pulley 21 and then turns back to pass over the guide pulley 22, whereafter it exits from the storage part 19' and goes forward to the rear of the unit case 1. With this arrangement, when the unit case is in stored condition the cord is pulled deep into the interior of the storage part 19' by the action of the spring 21' on the pulley 21 so that all slack in the cord is taken up. When the unit case 1 moves forward pulling the cord therewith, the pulley 21 moves to near the entrance of the storage part 19' overcoming the force of the spring 21' and as a result the cord 20 can be drawn out of the storage part 19'.

In a case where it is desired to make the unit case usable at a location somewhat removed from the housing 2, it is possible to provide a connector 20' at the end of the cord 20 for engagement with a plug provided at the rear of the unit case 1. Then, by removing the connector 20' and connecting an extension cord between it and the plug, it will be possible to use the unit case at a greater distance from the housing 2. In this case, however, when the connector 20' is disconnected from the unit case, it may be pulled deep into the housing 2 by the action of the pulley 21 and the spring 21', making it difficult to pull the cord back out for connection with the extension cord. To eliminate this possibility, a pivotable cord guide 23 having at its free end a guide hole 23a large enough to pass the cord but too small to pass the connector 20' is provided at the rear of the housing 2. This cord guide 23 is spring biased by a spring 23' in the direction of the arrow shown in FIG. 1 so that its free end is urged forward and the cord is threaded through the guide hole 23a by passing it through a narrow slit leading thereinto. When the unit case 1 is pushed into and stored in the housing 2, the rear of the unit case 1 pushes against the cord guide 23 causing it to pivot against the force of the spring 23'. On the other hand, when the unit case 1 moves forward, the cord guide 23 is pivoted by the force of the spring 23' until it is stopped by a stopper 23b, at which time the guide hole 23a faces forward so that even if the cord 20 is pulled in after the connector 20' is disconnected from the unit case, the connector 20' will be caught by the guide hole 23a and move no further inward. It is thus an easy matter to grasp the connector in order to draw out the cord 20 for connection with an extension cord.

In this embodiment, the whole of the top of the housing 2 is open except for the part covered by a strip 24 at the forward edge thereof. On the bottom of the housing 2 are provided a plurality of connection pillars 25 on which the cabinet of the radio cassette is mounted so as to close the top of the housing 2.

The unit case 1 is pushed out of the housing 2 quietly and slowly thanks to the action of the dampers 16 and can be pushed back into the housing easily with small force since the dampers do not operate during this operation.

It should be noted that in this invention the housing is not limited to the cabinet of a radio cassette and that the unit case is not limited to an electronic keyboard-type musical instrument.

As is clear from the foregoing, in accordance with the present invention, the unit case can be stored within the housing in the fashion of a drawer when not in use and, when needed for use, can be ejected from the front face of the housing by operating the release means.

What is claimed is:

1. A unit case housing apparatus comprising: a unit case, a unit case housing for storing the unit case in the fashion of a drawer, at least one energizing means between said housing and unit case for drawing the unit case in the direction of the front face of the housing, an engaging means on said housing for releaseably retaining the unit case in stored condition in the housing against the force of the energizing means, at least one pusher linked with the energizing means for urging the unit case from behind and pushing it out from the front face of the housing, and a release means for releasing the engaging means, said pusher comprising a damper for mitigating the force of the energizing means and causing the unit case to be pushed out of the housing slowly, said damper including a drive element positioned for engagement with a complementary member mounted in said housing during movement of the unit case outwardly from said housing, said drive element being pivotally supported adjacent said complementary member for effective disengagement with said complementary member during movement of the unit case into said housing whereby the damper is inoperative during movement of the unit case into the housing.

2. A unit case housing apparatus according to claim 1, wherein the energizing means is a spring.

3. A unit case housing apparatus comprising: a unit case, a housing for storing the unit case in the fashion of a drawer, housing guide means and complementary unit case guide means respectively located adjacent opposite ends of said housing and said unit case for guiding the unit case into and out of the housing, one of said guide means including an elongated fixed portion and an auxiliary pivotally supported portion, said pivotally supported portion being located for enabling the unit case to tilt relative to the housing when the unit case is in a position substantially out of said housing, spring means between said housing and unit case for biasing said unit case toward a position out of said housing, releaseable engaging means on said housing for releasably retaining the unit case in a stored position within the housing, said housing guide means comprising elongated rigid rails respectively adjacent opposite ends of the housing and short pivotally supported rail elements located adjacent a front face of the housing, said spring means comprising pushers respectively slidable on said rails and engagable with said unit case and spring elements connected between said housing and said pushers for biasing the pushers toward a front face of the housing, and damper means connected with one of said pushers for controlling movement of the unit case out of the housing under the force of said spring means, said damper means comprising a rotatable damper unit connected for movement in unison with one of said pushers and including a drive wheel, a complementary drive element disposed within said housing for engagement with the drive wheel during movement of the unit case out of the housing, said damper unit being pivotally supported with respect to said complementary drive element for effectively disengaging said drive wheel from said complementary drive element during movement of the unit case into the housing whereby the damper unit is inoperative during movement of the unit case into the housing.

* * * * *